(No Model.)
W. HAYBALL, Jr.
BICYCLE SUPPORT.
No. 586,817. Patented July 20, 1897.
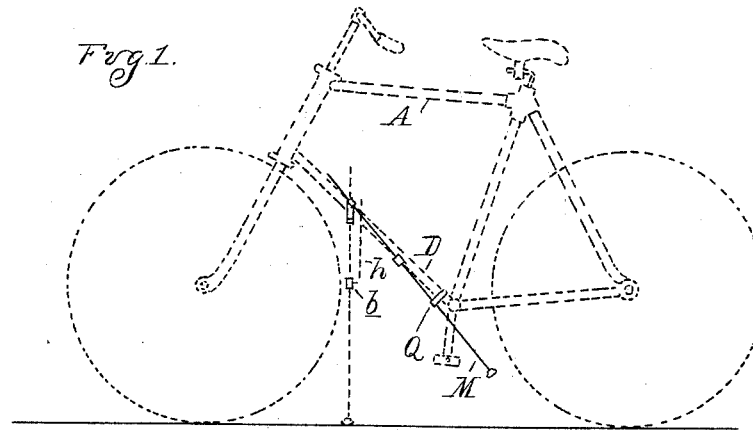
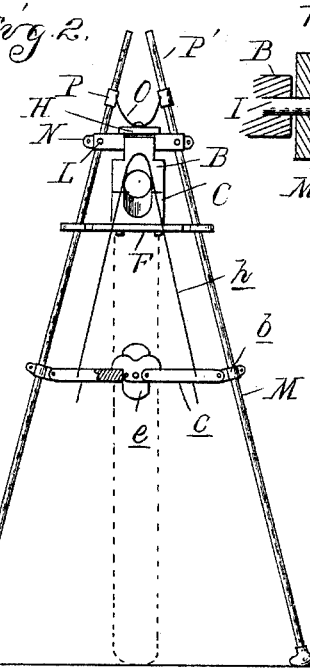
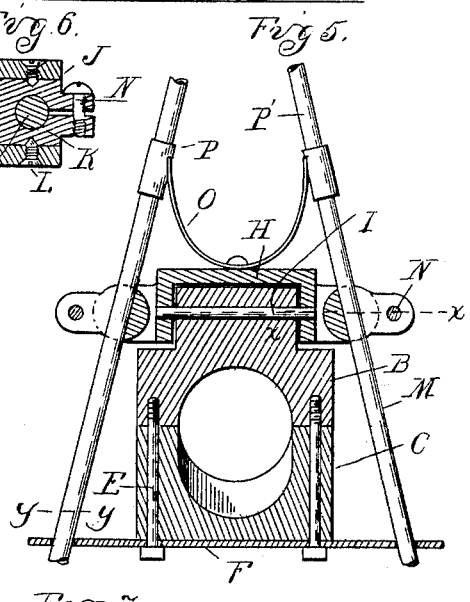
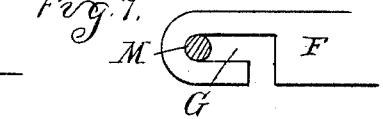
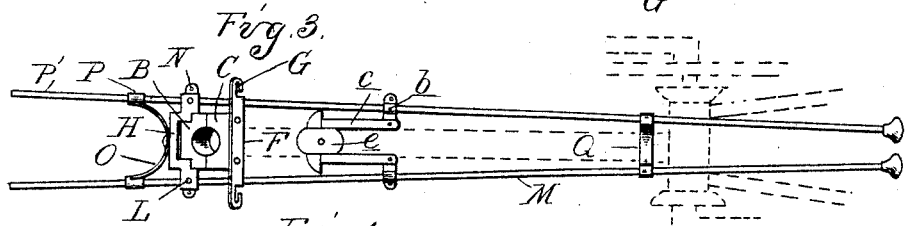
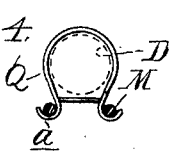
Witnesses
O. F. Barthel
M. B. Dougherty
Inventor
William Hayball Jr.
By Thos. L. Sprague & Son
Attys.
THE NORRIS PETERS CO., PHOTO-LITHO., WASHINGTON, D. C.

UNITED STATES PATENT OFFICE.

WILLIAM HAYBALL, JR., OF DETROIT, MICHIGAN.

BICYCLE-SUPPORT.

SPECIFICATION forming part of Letters Patent No. 586,817, dated July 20, 1897.

Application filed March 6, 1896. Serial No. 582,089. (No model.)

*To all whom it may concern:*

Be it known that I, WILLIAM HAYBALL, Jr., a citizen of the United States, residing at Detroit, in the county of Wayne and State of Michigan, have invented certain new and useful Improvements in Bicycle-Supports, of which the following is a specification, reference being had therein to the accompanying drawings.

The invention consists in the construction of a bicycle-support intended to hold the bicycle firmly in an upright position when not in use which may be quickly adjusted either to support the bicycle or may be folded back on the frame out of the way of the rider and out of contact with the ground when the bicycle is moving.

The invention consists in the construction, arrangement, and combination of the various parts, all as more fully hereinafter described.

I show my device applied to an ordinary "diamond" frame safety-bicycle.

In the drawings, Figure 1 is a side elevation of a bicycle, showing my device in its different positions in full and dotted lines. Fig. 2 is a rear elevation of the device, showing the legs spread and lowered to support the bicycle. Fig. 3 is a bottom plan showing the legs hung up on the bicycle-frame as when in motion. Fig. 4 is a section illustrating the construction of the bracket for supporting the legs. Fig. 5 is a vertical section through the clamp. Figs. 6 and 7 are respectively sections on lines $x$ $x$ and $y$ $y$, Fig. 5.

A represents the bicycle-frame of the diamond-frame "safety" type. B and C are two clamping members adapted to embrace the tube D thereof in rear of the front wheel, being secured together and upon the tube by screws E. These screws also preferably hold the plate F on the clamp, this plate having bayonet-slots G at each end.

At the upper end of the block B is the cap H, pivoted on a horizontal pivot I and having at each end the U-shaped bearings J. In the bearings are the split blocks K, pivoted on the centers or pointed screws L in opposite sides of the bearings J.

M are the legs, passing through apertures in the split blocks K and adapted to be clamped at any desired point of their length by means of the clamping-screw N, Figs. 5 and 6.

Secured to the cap H is the leaf-spring O, which at each end engages notched blocks P on the extension or handles P' of the legs. These blocks preferably slide on the handles as the spring assumes different positions relative to the handle. This spring acts by its tension to draw the foot of the legs together, and when the bicycle is in use holds them in the stirrups or hooks $a$ of the bracket Q, secured near the crank-hanger, as shown in Fig. 3.

Secured to the legs below the tube D are blocks $b$, preferably by set-screws or clamps, and the two opposite blocks are connected by the levers $c$ and tire-block $e$, as shown in Fig. 2, the connection being by a rule-joint to prevent their movement beyond the horizontal position. To these two levers are connected the lower ends of the arch-shaped loop $h$, which extends over the tube D.

The parts being in the position shown in full lines, Fig. 1 and in Fig. 3, to support the wheel, the rider grasps the handles P', turns the legs upon their pivots to disengage the feet from the hooks $h$, then rocks them forwardly. At the same time his hand-pressure on the handles spreads them, as shown in full lines in Fig. 2. The operator engages the upper part of the legs into the bayonet-slots G and then releases his hold, the spreader-levers holding the legs in separated position. The tire-block $e$ in this position bears against the front tire and holds the front wheel from angular motion, acting at the same time as a brake thereon. This supports the wheel firmly and prevents its movement from any slight blow.

To restore the legs to their folded or raised position, the operator takes hold of the loop $h$ and lifts up, folding the levers upon themselves, and the spring O acting to force the legs together, the operator at the same time rocking the legs upon their pivot I after disengaging them from the bayonet-slots and rocks them into engagement with the hooks $a$. In this position the spring O acts to prevent rattling or accidental disengagement of the legs from the hooks.

What I claim as my invention is—

1. In a bicycle-support in combination, a clamp, a block or plate pivoted thereon, legs pivoted in the ends of the plate, a spring acting to draw the legs together, and handles formed by extensions of the legs above their pivotal point by means of which the legs may be rocked and the feet spread.

2. In a bicycle-support, in combination, a clamp, the plate pivoted to the clamp, the legs pivoted in the plate and extending above the same to form handles, means for forcing the legs together, and the rule-jointed levers connecting the legs to hold them in their spread position.

3. In a bicycle-support, in combination, a clamp, the plate pivoted to the clamp, the legs pivoted to the plate, the plate F having bayonet-slots G and the rule-jointed levers connecting the legs.

4. In a bicycle-support, in combination, the clamp, the pivoted rocking legs, the rule-jointed levers, and the loop $h$ connecting the levers for the purpose described.

5. In a bicycle-support, the combination of the rocking legs, a brake-block between said legs, links pivoted to said legs and to the block adapted when in alinement to hold the legs apart or in their supporting position and adapted to apply the brake-block, and shoulders on the brake-block adapted to engage the links and lock them in their alined position, substantially as described.

6. In a bicycle-support and in combination, a clamp, a plate hinged to said clamp, legs pivotally connected to said plate intermediate their ends, means on one side of the pivot for holding the legs together, and means on the other side of the pivot for holding the legs in supporting position.

In testimony whereof I affix my signature in presence of two witnesses.

WILLIAM HAYBALL, JR.

Witnesses:
M. B. O'DOGHERTY,
OTTO F. BARTHEL.